July 11, 1933.  C. STERN  1,918,146
RAIL AND WHEEL FLANGE LUBRICATOR
Filed Nov. 2, 1932  2 Sheets-Sheet 2
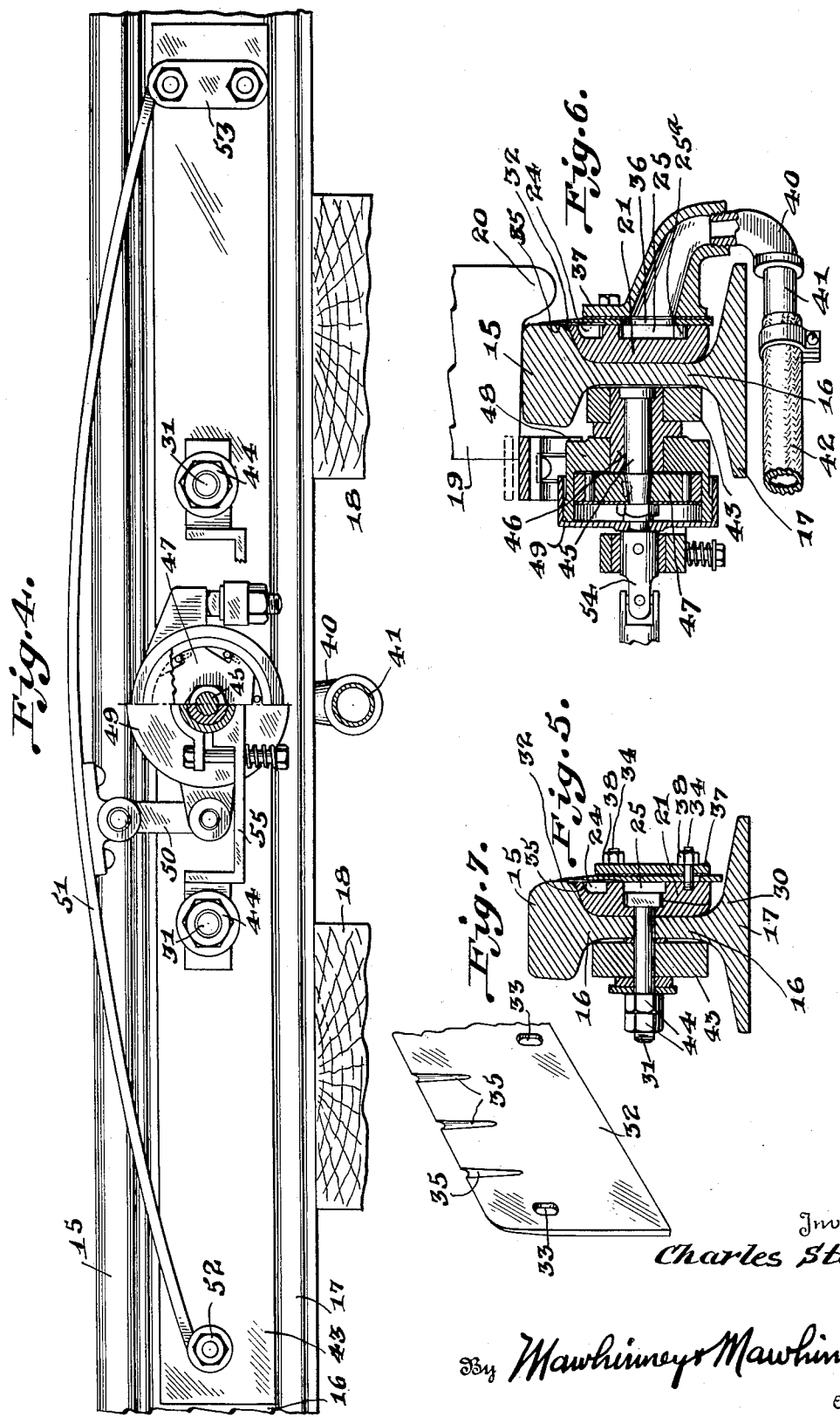
Inventor
Charles Stern,
By Mawhinney & Mawhinney,
Attorneys Patented July 11, 1933

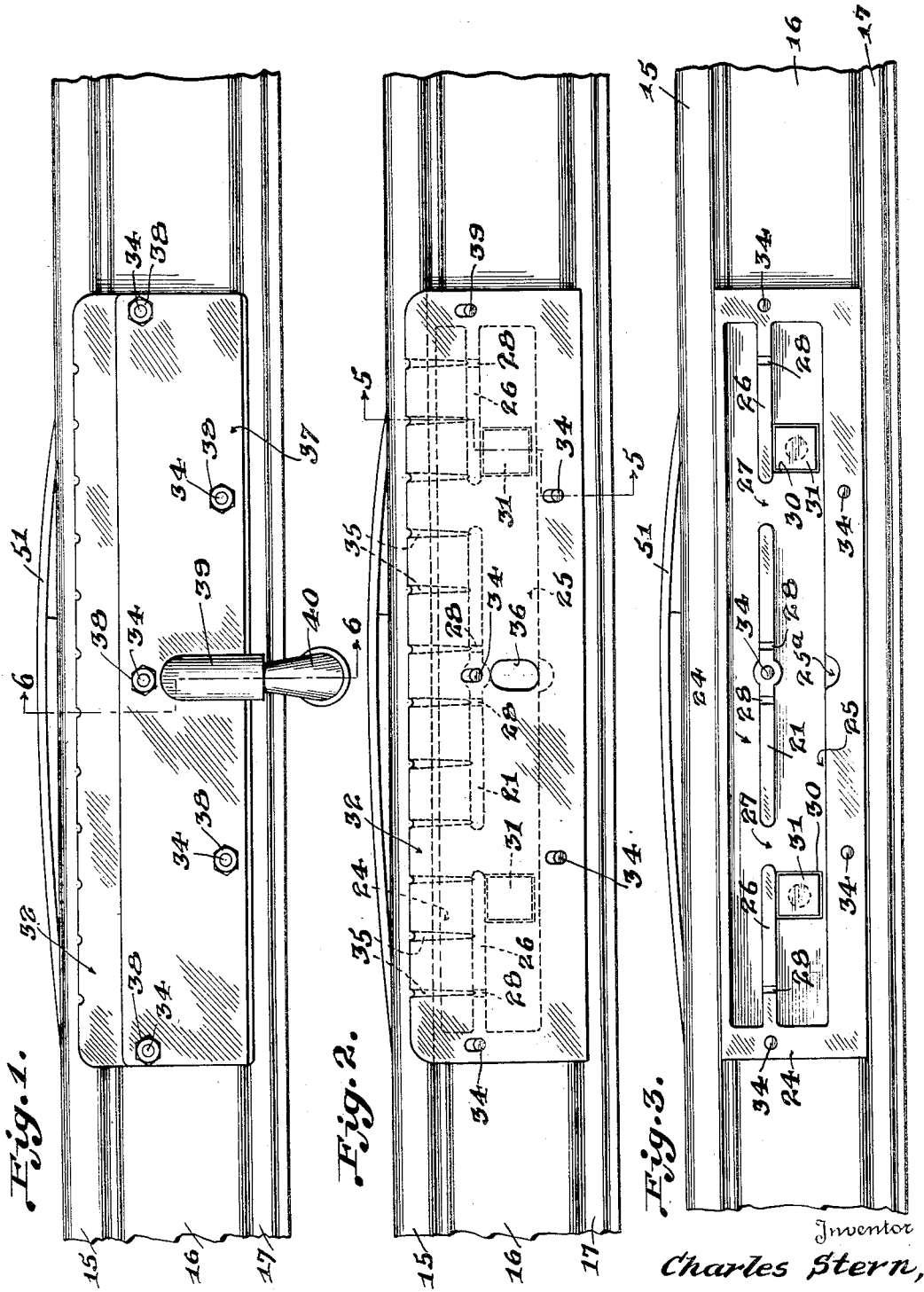

1,918,146

UNITED STATES PATENT OFFICE

CHARLES STERN, OF JERSEY CITY, NEW JERSEY, ASSIGNOR TO ARDCO MANUFACTURING COMPANY, OF HOBOKEN, NEW JERSEY, A CORPORATION OF DELAWARE

RAIL AND WHEEL FLANGE LUBRICATOR

Application filed November 2, 1932. Serial No. 640,903.

The present invention relates to a combined rail and wheel flange lubricator adapted for application to the rails of a track adjacent to and on curves particularly, so as to prevent wear and cutting of the rails and the wheel flanges about curves.

An object of this invention is to provide an efficient lubricator which will insure the application of the lubricant to the rail throughout a long distance from the device; which is of relatively short length so that it may be applied equally as well on the curved as on the straight rail sections approaching curves and without modification or curvature of the lubricator or the parts thereof; and which is of compact simple and neat construction having relatively few parts not easily jarred out of order and which functions with a minimum amount of lubricant and without wasting the same or splashing the lubricant over the rails, ties, road bed or on the rolling stock passing over the lubricator.

Another object of the invention is to provide a distributing plate for the lubricator which not only is efficient in depositing the lubricant in required quantities along the side of the rail head, but which also delivers the lubricant at spaced intervals proportioned to the length of the plate and the amounts of the lubricant fed at the spaced points, such that the lubricant is applied substantially continuously along the side of the rail head for a short distance above the plate to obtain a substantial amount of the lubricant spread over a relatively long circumferential distance of the wheel flange, picking up the lubricant, so that as the wheel makes a complete revolution the lubricated portion of the wheel flange will deposit a substantial amount of the lubricant in lengthwise spread condition along the side of the rail head at a distance of some five or six feet from the lubricator; increasing the efficiency and capacity of the device, especially since wheels of different diameters are used on rolling stock and the distances from the lubricator to the points of spreading of the lubricant will therefore vary and the lubricant will gradually extend in a continuous spread film for a long distance beyond the device, and the plate may be straight and flat and relatively short for application to curved or straight rails without impairing the effectiveness of the lubricator.

A further object of the invention is to so construct the several parts of the lubricator that the distributing plate may be adjusted from time to time, and in the initial installation of the lubricator, to compensate for wear at the inner edge of the rail head, or where the wheel flanges wear down the edge of the rail, and deposit the lubricant in spaced quantities on the side of the rail head in position to be picked up by the wheel flanges and with the quantities proportioned to properly lubricate the rail and wheel flanges without an excess amount of lubricant which would be thrown off and wasted by centrifugal force when the wheels turn at high speed.

Another object is to provide a lubricator with a single wearing part in the form of a small thin distributing plate which is inexpensive to manufacture and may be quickly interchanged when worn or broken.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is an inner side elevation of a section of a rail having the improved lubricator of this inventon applied thereto.

Figure 2 is a like view with the outer or feed plate removed.

Figure 3 is a similar view with both the feed and distributing plates removed.

Figure 4 is an outer side elevation of the section of a rail, showing the opposite or outer side of the lubricator applied thereto.

Figure 5 is a transverse section, on a reduced scale taken through one end portion of the lubricator as applied to the rail, taken substantially on the line 5—5 of Figure 2 and with the distributing plate in lowered position.

Figure 6 is a transverse section taken through the lubricator on the rail, on substantially the line 6—6 of Figure 1, and Figure 7 is a detail fragmentary perspective view of the distributing plate, looking at the inner side of the same.

Referring now to the drawings, the invention is shown as applied to a rail 15 having the usual head which is supported on the web 16 provided at its lower end with the base flange 17. The rail 15 is part of a track for railroads and the like and is supported on ties 18. The rail 15 is adapted to support wheels 19 of rolling stock which roll along the upper surface of the head of the rail 15 and which have flanges 20 disposed at one side of the rail head, as shown in Figure 6, to retain the wheels on the rail. The section of the rail 15 shown in the drawings may be a straight section or a curved section as it is immaterial to the application, operation and efficiency of the present lubricator.

The improved lubricator comprises a body plate 21 which is seated against the inner side of the rail web 16 beneath the head of the rail. The body plate 21 has, in its outer side, upper and lower cavities or recesses 24 and 25 extending horizontally and separated from each other by a horizontal rib or partition 26. The rib 26 has interruptions 27 toward the opposite ends of the body plate 21 and notches 28 at suitable intervals to intercommunicate the cavities and effect uniform distribution of a lubricant from the lower cavity 25 into all parts of the upper cavity 24. The body plate 21 is provided in its outer face and in the lower edge portion of the lower cavity 25 with a recess 25ª located intermediate the ends of the cavity 25 for accommodating the entrance of lubricant into the cavity under certain adjustments of the device hereinafter described.

The body plate 21 has preferably non-circular recesses or seats 30 in the inner wall of the lower cavity 25 to receive the non-circular heads of clamping bolts 31 which pass through the rail web 16 for holding the body plate in place.

Fitting flat against the outer side of the body plate 21 is a distributing plate 32 which closes the outer sides of both the upper and lower cavities 24 and 25.

The distributing plate 32 is provided at suitable points with vertically elongated openings 33 extending therethrough, as shown in Figure 7, and through which pass studs 34 which are threaded or otherwise secured in the body plate 21. The distributing plate 32 may be raised and lowered within the limits of the slots 33 to adjust the upper edge of the plate 32 at the desired height against the side of the rail head. The plate 32 is in raised position, as shown in Figure 6, when the rail is new, and is lowered as shown in Figure 5, when the rail is worn.

The object of the raising and lowering feature of the plate 32 is essential as it enables the discharge of the lubricant at the desired point on the side of the rail head. For example, if rail is new the lubricant should be discharged near the top on the side of the rail head, and when rail is worn the plate is proportionately lowered to have the lubricant discharged at the proper point.

As shown in Figures 2, 5, 6 and 7, the plate 32 is provided at its inner side and at its upper portion with a series of vertical grooves 35 which may flare upwardly and provide a plurality of closely spaced apart feed openings for the lubricant which open against the side of the rail head to deposit the lubricant directly thereon.

The grooves 35 open through the upper edge of the distributing plate 32 so that the separate quantities of the lubricant ejected from the grooves 35 may be discharged on the side of the rail head.

The grooves 35 extend downwardly in the distributing plate 32 but a short distance so that in all positions of the plate the lower ends of the grooves do not project below the horizontal dividing rib 26. This insures that the lubricant under pressure in the lower cavity 25 will be evenly distributed in the upper cavity and cannot pass directly upward through any particular one or more grooves 35. The distributing plate 32 is provided at its central portion with a feed opening 36, as shown in Figures 2 and 6, which is vertically elongated and adapted to register more or less with the recess 25ª in the body plate 21 when the distributing plate 32 is lowered.

The distributing plate 32 is held at the desired height against the body plate 21 by a feed or clamping plate 37 which, as shown in Figures 1, 5 and 6, may be of substantially the same length as the body and distributing plates 21 and 32 but which is of less height than the same to adequately clear the wheel flange 20 and to overlap the horizontal division rib 26.

The plate 37 is suitably apertured to engage over the stud bolts 34 and is clamped in position by nuts 38 which are of any suitable type adapted to be locked in place when turned up against the clamping plate 37. The plate 37 holds the distributing plate flat against the outer side of the body plate and closes the outer sides of the cavities 24 and 25 and also of the notches 28 and the recess 25ª. By loosening the nuts 38 and the plate 37 the plate 32 may be raised or lowered, and the plate 32 may be removed and interchanged merely by removing the nuts 38 and the plate 37 from the stud bolts 34.

At an intermediate point, the clamping or feed plate 37 has a feed neck 39 which is disposed opposite the feed opening 36 in the distributing plate 32 on the outer side of the feed plate 37 and which opens through the latter plate. The neck 39 tapers outwardly and downwardly and terminates in a downturned threaded end which is adapted to lie beyond the base flange 17 of the rail as shown in Figure 6. An elbow 40 is secured to the outer end of the neck 39 and is proportioned and disposed to face beneath the rail and receive a pipe or nipple 41 to which may be attached one end of a pipe or hose 42 leading from any suitable source of lubricant under pressure.

The attaching or holding bolts 31 pass through suitably formed openings in the web 16 of the rail to the opposite side of the latter and pass through a supporting plate 43 which receives pressure from the clamping nuts 44, washers or the like being employed if desired, to hold the body plate 21 and the supporting plate 43 against the opposite sides of the rail web. Any other suitable means may be employed for securing the body plate 21 and its parts to the side of the rail.

The supporting plate 43 may be utilized for supporting the tread or depressible mechanism for operating a lubricant feeding device, such as shown in Figures 4, 5 and 6. In these figures the supporting plate 43 carries a short shaft 45 by means of a bushing 46, and the shaft has a ratchet wheel 47 on its outer end surrounded by a rotatable shell or casing 48. The casing 48 may have an enclosing cap 49 on its outer end. The ratchet wheel 47 has inclined notches or seats in its periphery and carries spring pressed rollers, or the like, adapted to bind between the ratchet wheel 47 and the inner wall of the casing 48 when the same are turned relatively in opposite directions.

The casing 48 is connected by a link 50, Figure 4, to a tread member 51 pivoted at one end on a stud 52 projecting outwardly from the supporting plate 43 near one end thereof.

A shackle 53 is mounted on the outer face of the supporting plate 43 near the opposite end thereof and is pivoted to the free end of the tread member to anchor the same and permit longitudinal spreading when the intermediate portion of the tread member is depressed, said intermediate portion normally projecting above the horizontal plane of the tread of the rail for contact with the wheel 19 as shown in Figure 6 to turn the casing 48. The resiliency of the tread member 51 is adapted to return it and the casing 48 to a normal position of rest. When the casing is turned in one direction the ratchet wheel 47 and its shaft 45 is turned therewith. The shaft 45 is connected by a universal joint 54 to an operating shaft of a pressure lubricant feeding device of any suitable type. A brake bracket 55 may be secured at opposite ends over the holding bolts 31 and has a friction bearing portion to engage the lower side of the inner end of the universal joint 54. The bracket 55 carries a spring pressed cap piece fitting over the joint 54 to hold the shaft 45 from racing and from accidental backward movement.

It is obvious that various changes and modifications may be made in the details of construction and design of the above specifically described embodiment of this invention without departing from the spirit thereof, such changes and modifications being restricted only by the scope of the following claims:

What is claimed is:

1. In a rail and wheel flange lubricator, a body plate having upper and lower cavities in its outer side with a dividing bead between the cavities and spaced passages through the bead for distributing lubricant uniformly between the passages, means for securing said body plate against one side of a rail, a distributing plate fitting against the outer side of the body plate to close the outer sides of said passages and having outlet grooves at its inner side and at its upper end, and a clamping plate secured against the distributing plate for holding the latter in place and having an inlet neck for receiving lubricant under pressure, said distributing plate having an opening therethrough for passage of lubricant into said body plate.

2. In a rail and wheel flange lubricator, a body plate, a distributing plate fitting against the outer side of the body plate, a clamping plate secured against the distributing plate for binding the latter to the body plate, and means for securing all of said plates against one side of a rail, said body plate having upper and lower cavities in its outer side adjacent the distributing plate and with spaced passages between the cavities, said clamping plate having a connection for lubricant under pressure and the distributing plate having an opening therethrough for admitting lubricant under pressure to the lower cavity in the body plate, said distributing plate having grooves in its inner side communicating with the upper cavity and opening through the upper edge of the plate.

3. In a rail and wheel flange lubricator, a body plate, means for securing the body plate against one side of the rail beneath the head thereof, said body plate having a lower cavity and an upper cavity with a partition rib between the cavities and with openings disposed at spaced points through the rib for intercommunicating the cavities, means for feeding lubricant under pressure to the lower cavity whereby the lubricant may under pressure pass into the upper cavity for filling the latter, and a distributing plate secured over the body plate for closing said cavities and having outlet grooves in its inner side in register with the upper cavity in said body plate, the grooves extending through the upper edge of the distributing plate for delivering lubricant in spaced quantities along the side of the rail head.

4. In a rail and wheel flange lubricator, a body plate having upper and lower chambers therein with spaced passages between the chambers, means for delivering lubricant under pressure to the bottom chamber whereby the lubricant may pass uniformly into the upper chamber, means for securing the body plate to the side of a rail, and a distributing member carried by the body plate and adapted to lie against the side of the rail head having grooves therein registering with the upper chamber in the body plate for delivering lubricant in spaced small quantities along the side of the rail head.

5. In a rail and wheel flange lubricator, a body plate adapted to be attached to one side of a rail, said body plate having upper and lower cavities therein with spaced passages between the cavities, a distributing plate disposed against the outer side of the body plate for closing the cavities and having grooves in its inner side in register with the upper cavity and opening through the top of the distributing plate for delivering lubricant to the side of the rail head, and a clamping plate detachably secured to the body plate and engaging the distributing plate to bind the latter in position and having an inlet for the reception of lubricant under pressure, said distributing plate having a slot therethrough for passage of lubricant from said inlet into the lower cavity of the body plate.

6. In a rail and wheel flange lubricator, a body portion having upper and lower chambers therein with spaced passages between the chambers for establishing communication between the chambers, means for admitting lubricant under pressure to the lower chamber whereby the lubricant is adapted to pass into the upper chamber under substantially equal pressure through the entire length thereof, said body portion having a relatively thin element projecting above the upper cavity for engagement against one side of a rail head and said element having openings leading from the upper cavity to the rail head for depositing quantities of lubricant against the side of the rail head.

7. In a rail and wheel flange lubricator, a body portion having upper and lower chambers therein with means for admitting lubricant under pressure to the lower chamber, said body portion having passages at spaced points between the chambers for equalizing pressure of lubricant passing between the chambers, said body portion also having a rail head distributing part adapted to lie against one side of a rail head, said distributing part having outlet openings communicating with the upper cavity for conducting lubricant therefrom to the side of the rail head.

8. In a rail and wheel flange lubricator, a body plate having upper and lower cavities with intercommunicating spaced openings therebetween, a distributing plate closing said cavities at one side and having outlet grooves in the inner side of its upper end portion to provide outlet openings for lubricant from the upper cavity, and a clamping plate for securing said body and distributing plates together and having supply means for connection with a source of lubricant under pressure.

9. In a rail and wheel flange lubricator, a body plate, means for securing the body plate to one side of a rail beneath the head thereof, said body plate having upper and lower cavities in its outer side with a division rib extending between the cavities and with passages through the rb at spaced points between the cavities, means for feeding lubricant under pressure to the lower cavity, and a detachable distributing plate clamped against the outer side of the body plate to close the cavities and having a series of grooves in its inner face opening through its upper end and registering with the upper cavity in the body plate.

10. In a rail and wheel flange lubricator a body plate, means for securing the body plate to one side of a rail, said body plate having upper and lower cavities in its outer face with passages spaced apart and intercommunicating the cavities, a clamping plate, stud bolts carried by the body plate and supporting the clamping plate, said clamping plate having an inlet adapted for connection with a source of lubricant under pressure, and a distributing plate interposed between the body and the clamping plates adapted to be clamped against the body plate to close the outer sides of said cavities, said distributing plate having a slot therethrough leading to the lower cavity for passage of lubricant under pressure thereto, said distributing plate having a plurality of closely spaced apart grooves in its inner side registering with the upper cavity and opening through the upper end of the distributing plate, said distributing plate having vertically elongated openings therein for the reception of the intermediate portions of the stud bolts for holding the distributing plate on the bolts and admitting of vertical adjustment of the distributing plate between the body and clamping plates.

11. In a rail and wheel flange lubricator, a body plate having a cavity therein, a distributing plate slidably mounted against the body plate to close the cavity and having grooves therein for conducting a lubricant from the cavity to the head of a rail, said distributing plate adapted for adjustment to the desired height against the rail head, and a clamping plate connected to the body plate and adapted to bind the distributing plate against the body plate.

12. In a rail and wheel flange lubricator, a body plate adapted to fit against the side of a rail, and having a lubricant receiving cavity therein, supporting elements extending outwardly from the body plate, a clamping plate mounted on said supporting elements, and a distributing plate mounted between the body and clamping plates and having grooves in its upper end adapted to open against the side of the head of the rail and opening into the cavity of the body plate, said distributing plate having slots therein for the supporting elements to admit vertical adjustment of the distributing plate between the body and clamping plates.

In testimony whereof I affix my signature.

CHARLES STERN.